United States Patent Office 3,847,857
Patented Nov. 12, 1974

3,847,857
STAIN RESISTANT COATING COMPOSITION
Thomas H. Haag, Feasterville, and Benjamin B. Kine, Elkins Park, Pa., assignors to Rohm and Haas Company, Philadelphia, Pa.
No Drawing. Continuation-in-part of application Ser. No. 263,375, June 5, 1972, which is a continuation-in-part of application Ser. No. 49,190, June 23, 1970, which in turn is a continuation-in-part of application Ser. No. 679,973, Nov. 2, 1967, all now abandoned. This application Nov. 5, 1973, Ser. No. 412,846
Int. Cl. C09d 3/74
U.S. Cl. 260—29.6 RW        25 Claims

ABSTRACT OF THE DISCLOSURE

Aqueous coating compositions having sedimentation stable dispersed emulsion polymer with amine or quaternary ammonium groups with or without counterions of a polyvalent metal. The polymer has a particle size in the range of 0.05 to 0.3 microns. The stable compositions of the present invention are resistant to staining when applied to woods having strong staining tendencies.

---

This application is a continuation-in-part of our copending application Ser. No. 263,375, filed June 5, 1972 now abandoned which is a continuation-in-part of Ser. No. 49,190, filed June 23, 1970, now abandoned, which is a continuation-in-part of our copending application Ser. No. 679,973, filed Nov. 2, 1967, now abandoned.

Harren and Haag in U.S. Pat. No. 3,494,878 describe resins having a particle size of from 0.5 to 25 microns. Said resins are prepared by suspension or granular polymerization which resins may be ground down to a smaller particle size. It is well-known in the polymer art that suspension and granular polymerizations will rarely yield resins having a particle size of less than 10 microns.

Woods, such as cedar, redwood, mahogany and the like, contain large amounts of tannins and lignins which stain paints applied to their surface. The stains are extracted from the wood by moisture and diffuse through the paint to its surface where the stain tends to concentrate.

Wood is treated with a primer coat to seal the wood, to improve adhesion of subsequent coats and to inhibit the passage of the stain components. Presently, these primers are formulated with lead or barium pigments, such as lead phosphite, basic lead silicate, basic lead silico chromate, barium metaborate and the like. Such pigments are highly toxic and their use is being restricted by law.

Over the primer coat there is applied a topcoat, its purpose being both decorative and protective. Topcoats are designed to withstand the abuse of sunlight, weather, abrasion, chemicals, dirt and other stress producing factors which tend to degrade the wood underneath and also the topcoat itself. Water based topcoats, when applied to a staining wood or hard board composition, are found to be severely stained on drying, if the wood has not been adequately primed.

This invention now provides the means for making a primer which prevents stains from discoloring a topcoat. The products of this invention are equal to or more effective than those presently employed; i.e., those containing the toxic lead or barium pigments. In addition to their stain inhibiting properties, the products of this invention are non-toxic and in contrast to the lead pigment, they evidence no staining on exposure to sulfide fumes and are free from lead frosting.

This invention consists of incorporating various functional groups into the polymers described below to entrap and insolubilize the stain components. The stains are anionic; the functional group in the polymer is cationic. The anion stain reacts with the cationic functional group and becomes entrapped in the primer film. The entrapped reaction products then serves as a further barrier to the passage of additional stain components.

The polymer may be prepared in two forms:

Type I.—A polymeric dispersion of highly cross-linked, non-thermoplastic, non-film forming, spherical particles which range in size from 0.05 to 0.3μ in diameter. These particles may be isolated by freeze-drying or spray-drying and can be reconstituted in either water or oil.

Type II.—A polymeric dispersion of non-cross-linked to slightly cross-linked, thermoplastic, film forming, spherical particles which range in size from 0.1 to 1.0μ in diameter. Type II polymer can also serve as a binder for pigments.

Type I polymer is more effective than Type II polymer because Type I contains higher quantities of the quaternary or tertiary amine cation. However, either polymer can be used alone or in conjunction with each other. If used in conjunction, Type I and Type II tend to reinforce each other and are more effective than a like quantity used alone. If used alone, Type I requires the addition of a non-stain inhibiting vehicle, in order that it may be bound into the paint film, whereas Type II is its own binder.

We have found that by preparing the copolymers of this invention by emulsion polymerization we obtain, directly, spherical resins having a particle size in the range of from 0.05 to 0.3 microns. Resins of this size when employed in the manner disclosed herein afford coating compositions having a long shelf life without undergoing sedimentation.

Groups at the polymer interface are rate determining; polymer particles with a high surface area to volume ratio are more effective. Thus, polymers prepared by emulsion polymerization are significantly more effective than if the same compositions were prepared by suspension polymerization to yield ion exchange beads, since the surface area to volume ratio of the emulsion polymer is many fold that of the ion exchange bead. For example, emulsion polymer particles 0.1 microns in diameter have a surface to volume ratio one hundred times as great as a suspension polymer with a diameter of 10 microns. A particle size of 10 microns is considered small for suspension polymers. A more typical value is 100 microns while a particle size of 0.1 microns to 0.2 micron diameter is normal for a polymer prepared by emulsion polymerization.

In accordance with the present invention, coating compositions having exceptional stability are provided which contain either:

(A) A sedimentation stable, dispersed crosslinked water-insoluble vinyl addition emulsion copolymer of a mixture of:

(1) from 5 to 70% by weight and preferably from 25 to 65% by weight of one or more monomers containing an amine or quaternary ammonium group in base or salt form;
(2) from 1 to 50% and preferably from 3 to 25% by weight of one or more polyethylenically unsaturated crosslinking monomers and
(3) from 0 to 80% by weight (to make 100%) of one or more monoethylenically unsaturated monomers of neutral or nonionic character or (B) a sedimentation stable dispersed, water- insoluble, linear or cross-linked vinyl addition emulsion copolymer of a mixture of (1) from 5 to 70% by weight and preferably from 25 to 65% by weight of one or more monomers containing an amine or quaternary ammonium group in salt form;

(2) from 0 to 50% and preferably from 3 to 25% by weight of one or more polyethylenically unsaturated cross-linking monomers and (3) from 0 to 89% by weight (to make 100%) of one or more monoethylenically unsaturated monomers of neutral or nonionic character, the counterion of the salt being a metal counterion in aqueous media, especially counterions derived from boron, chromium, molybdenum and tungsten. The resulting coating compositions are extremely stable and reduce the staining effect of substrates, such as cedar, redwood, and mahogany woods.

The dispersed copolymer in (A) may contain quaternary ammonium groups cross-linked as a result of the use of a difunctional alkylating agent, in which case the polyethylenically unsaturated monomer may be partially or completely omitted. Similarly, the dispersed copolymer in (B) may contain quaternary ammonium groups cross-linked as a result of the use of a di-functional alkylating agent whether or not a cross-linking polyethylenically unsaturated monomer is used in making the copolymer.

The present invention is concerned with stable aqueous coating compositions whose binder comprises a vinyl addition polymer prepared by emulsion polymerization. The most important of these dispersions used in making water-based paints are polymers, including homopolymers and copolymers of:

(1) vinyl esters of an aliphatic acid having 1 to 18 car- carbon atoms, especially vinyl acetate;

(2) acrylic acid esters and methacrylic acid esters of an alcohol having 1 to 18 carbon atoms, especially methyl acrylate, ethyl acrylate, isopropyl acrylate, isobutyl acrylate, butyl acrylate, 2-ethylhexyl acrylate, methyl methacrylate, ethyl methacrylate and butyl methacrylate; and (3) mono- and di-ethylenically unsaturated hydrocarbons, such as ethylene, isobutylene, styrene and aliphatic dienes, such as butadiene, isoprene and chloroprene.

Poly(vinyl acetate) and copolymers of vinyl acetate with one or more of the following monomers: vinyl versatate or other vinyl esters of fatty acids having 3 to 18 carbon atoms, vinyl chloride, vinylidene chloride, acrylonitrile, methacrylonitrile, mono- or difumaric or di-maleic acid esters, such as the alkanols having 1 to 4 carbon atoms, e.g., monomethyl fumarate, diethyl maleate or fumarate, dibutyl maleate or monobutyl maleate, or one or two of the acrylic and methacrylic acid esters mentioned above are well-known as the film-forming component of aqueous base paints. Similarly, copolymers of one or more of the acrylic or methacrylic acid esters mentioned above with one or more of the following monomers: vinyl acetate, vinyl esters of higher fatty acids, the mono- or di-alkyl esters of itaconic acid, the mono- or di-alkyl esters of fumaric acid or the mono- or di-alkyl esters of maleic acid, such as the esters of methanol, ethanol, or butanol, vinyl chloride, vinylidene chloride, styrene, vinyltoluene, acrylonitrile, and methacrylonitrile are also more or less conventionally employed in aqueous base paints. Homopolymers of ethylene or isobutylene and copolymers of one or more of these hydrocarbons or of styrene with one or more esters, nitriles, or amides of acrylic acid or of methacrylic acid or with vinyl esters, such as vinyl acetate and vinyl chloride, or with vinylidene chloride are also used. The diene polymers are generally used in aqueous base paints in the form of copolymers with one or more monomers following: styrene, vinyltoluene, acrylonitrile, methacrylonitrile, and the above-mentioned esters of acrylic acid or methacrylic acid. It is also quite common to include a small amount, such as ½ to 2.5% or more of an acid monomer in the monomer mixture used for making the copolymers of all three general types mentioned above by emulsion polymerization. Acids used include acrylic, methacrylic, itaconic, aconitic, citraconic, crotonic, maleic, fumaric, the dimer of methacrylic acid, and so on.

These aqueous dispersions may be made using one or more emulsifiers of anionic, cationic, or nonionic type. Mixtures of two or more emulsifiers regardless of type may be used, except that it is generally undesirable to mix a cationic with an anionic type in any appreciable amounts since they tend to neutralize each other. The amount of emulsifier may range from about 0.1 to 6% by weight or sometimes even more, based on the weight of the total monomer charge. When using a persulfate type or, in general, an ionic type of initiator, the addition of emulsifiers is often unnecessary and this omission or the use of only a small amount, e.g., less than about 0.5% of emulsifier, may sometimes be desirable from the cost standpoint (elimination of expensive emulsifier), and less sensitivity of the dried coating or impregnation to moisture, and, hence, less liability of the coated substrate to be affected by moisture, which, for instance, would produce coatings less liable to swelling or softening, particularly when subjected to humid atmospheres. The particle size or diameter of these dispersed polymers is from about 0.05 to 1.0 microns. The particle size whenever referred to herein, is the "number average diameter." This number, expressed in microns, is determined using the dissymmetry light-scatter method or the electron microscope. A description of the light-scatter method can be found in the *Journal of Colloid Science* 16, pages 561 to 580, 1961 (Dezelic and Kratohoic). In general, the molecular weight of these emulsion polymers are high, e.g., from about 100,000 to 10,000,000 viscosity average, most commonly above 500,000.

Examples of amine-containing monomers that may be used as component (1) of the cross-linked copolymer include monovinylpyridines of the following formula:

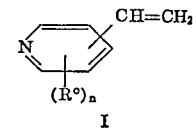

I wherein $R°$ is H or alkyl of 1 to 12 carbon atoms and $n$ is an integer having a value of 1 to 4. Examples include 2-vinylpyridine; 3-vinylpyridine; 4-vinylpyridine; 2-methyl-5-vinylpyridine; 5-methyl-2-vinylpyridine; 4-methyl-2-vinylpyridine; 2-ethyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2 - methyl-5-undecyl-3-vinylpyridine; 3-dodecyl-4-vinylpyridine; 2,4-dimethyl-5,6-dipentyl-3-vinylpyridine; 2-decyl-5-($\alpha$-methylvinyl)-pyridine.

Other monomers containing amino groups include compounds of the following formula

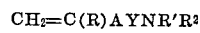

II wherein R is H or $CH_3$; A is O, S,

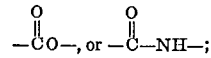

Y is an alkylene group having 2 to 10 carbon atom, R' is H, phenyl, methylbenzyl, benzyl, cyclohexyl or alkyl having 1 to 6 carbon atoms, and R' and $R^2$ may be joined together with the nitrogen atom to which they are attached to form morpholino, piperidino or pyrolidino.

Examples of the compounds of Formula II include: $\beta$-aminoethylvinyl ether or sulfide, $\beta$-aminoethyl acrylate or methacrylate, N-($\beta$-aminoethyl) acrylamide or -methacrylamide; 2-dimethylaminoethyl acrylate or methacrylate; 2-dimethylaminoethyl vinyl ether or sulfide; N-(2-dimethylaminoethyl) acrylamide or methacrylamide; 2-diphenylaminoethyl acrylate or methacrylate; 2-diphenylaminoethylvinyl ether or sulfide; 10-aminododecylvinyl ether; 8-aminooctylvinyl ether; diethylaminohexyl methacrylate; diethylaminoethylvinyl ether; 5-aminopentylvinyl ether; 3-aminopropylvinyl ether; 2-aminobutylvinyl ether; 4-aminobutylvinyl ether; 2-aminoethylvinyl ether; N-(3,5,5-trimethylhexyl)aminoethylvinyl ether; N-cyclohexylaminoethylvinyl ether; tert-butylaminoethyl acrylate or methacrylate; 2-(1,1,3,3-tetramethylbutylamino) ethyl methacrylate; N-tert-butylaminoethylvinyl ether; N-methylaminoethylvinyl ether; N-2-ethylhexylaminoethylvinyl ether; N-tert-octylaminoethylvinyl ether, N-(2-diphenylaminoethyl)acrylamide or methacrylamide; 2-morpholinoethyl acrylate or methacrylate; 2-morpholinoethylvinyl ether or sulfide; N-(2-morpholinoethyl)acrylamide or methacrylamide; 2-piperidinoethyl acrylate or methacrylate; 2-piperidinoethyl acrylate or methacrylate; 2-piperidinoethyl vinyl ether or sulfide; N-(2-piperidinoethyl)acrylamide or methacrylamide; 2-pyrrolidinoethyl acrylate or methacrylate; 2-pyrrolidinoethyl vinyl ether or sulfide; N-(2-pyrrolidinoethyl) acrylamide or methacrylamide; 3-diethylaminopropyl acrylate or methacrylate; 3-diethylaminopropyl vinyl ether or sulfide; N-(3-diethylaminopropyl)acrylamide or methacrylamide; 2-dibenzylaminopropyl acrylate or methacrylate; 2-dibenzylaminopropyl vinyl ether or sulfide; N-(2-dibenzylaminopropyl) acrylamide or methacrylamide; 8-dimethylaminooctyl acrylate or methacrylate; 8-dimethylaminooctyl vinyl ether or sulfides; N-(8-dimethylaminooctyl) acrylamide or methacrylamide.

Any of these amine-containing monomers may be alkylated by means of a single alkylating agent or a mixture thereof, to form monomeric quaternary ammonium compounds. Such monomers are known. Examples of the alkylating agent (herein intended to include aralkylating or substituted aralkylating agents) include the following: methyl chloride, ethyl chloride, benzyl chloride, allyl chloride, substituted allyl chloride, e.g., dodecylallyl choride, dodeceny chlorides, alkylbenzyl chlorides, e.g., octylbenzyl chlorides (from diisobutylene), any chloromethylated aromatic-like compound, e.g., chlorobenzyl chloride, chloromethylated thiophene, chloromethylated furane, chloromethylated naphthalene, or corresponding bromides or iodides, e.g., phenoxyethyl bromide, methyl iodide; dimethyl sulfate, dimethyl sulfite, dimethyl phosphite, ethylene oxide, propylene oxide, styrene oxide, and butylene oxide. For example, a mixture of 17.9 g. (0.109 mol) of monomeric dimethylaminopropylacrylamide, 13.8 g. (0.109 mol) of benzyl chloride, 74 g. of absolute ethanol (30% solids) and di-$\beta$-naphthol may be heated to reflux for two hours. The product may be isolated by concentration in vacuo.

Any of such monomeric quaternary ammonium compounds may be used as component (1) of the cross-linked polymer.

If cross-linking is derived partially or entirely from the use of a difunctional alkylating agent, such an agent may be reacted with a tertiary amine containing monomer before copolymerization or with the polymer containing tertiary amine groups.

Examples of difunctional alkylating agents that may be used to impart part or all of the cross-linking in the dispersed, water-insoluble copolymers containing quaternary ammonium groups are 1,4-dichlorobutene-2, 1,4-di(chloromethyl) benzene, diethylene glycol-epichlorohydrin reaction products, 1,6-dibromohexane, epichlorohydrin, and diglycidyl phthalate, and polyepoxides having two vic-epoxy groups, such as any of those disclosed in the passages of column 2, line 45, to column 3, line 42 and column 6, line 48 to column 7, line 6 of U.S. Pat. 2,992,132.

Examples of the cross-linking monomers that may be used include any copolymerizable compound which contains at least two non-conjugated points of ethylenic unsaturation or two or more non-conjugated vinyl or vinylidene groups of the structure, $H_2C=C<$, such as divinyltoluene, divinylbenzene, trivinylbenzene, divinylnaphthalene, ethylene glycol diacrylate or dimethacrylate, trimethylene glycol diacrylate or dimethacrylate, other $(C_3-C_6)$alkanediol diacrylates or dimethacrylates, diethylene glycol diacrylate, diethylene glycol dimethacrylate, triethylene glycol diacrylate or dimethacrylate, 2-ethylhexane-1,3-dimethacrylate, divinylxylene, divinylethylbenzene, divinyl ether, divinyl sulfone, allyl ethers of polyhydric compounds such as of glycerol, pentaerythritol, sorbitol, sucrose, resorcinol, etc., divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, and 1,2-di($\alpha$-methmethylenesulfonamido)ethylene. Sufficient cross-linking monomer is used to assure that the cross-linked copolymer obtained is water-insoluble. If cross-linking is the result of using a difunctional alkylating agent, sufficient of the latter is used to assure that the copolymer is adequately insoluble, whether such insolubility results from the alkylating agent or cross-linking monomer or from use of both in any particular instance.

Examples of the neutral or nonionic monomers of component (3) include any of the monomers that are mentioned hereinabove as possible components of the water-insoluble vinyl addition polymer used as the major part of or the entire constituent of the binder.

The cross-linked polyelectrolyte polymer (A) is prepared by an emulsion polymerization procedure so that the polymer thereby produced is stably dispersed in the aqueous polymerization medium at concentrations in the range of 10% to 60% solids or higher. Such a stable dispersion can readily be mixed with the aqueous dispersion of the binder in the proper proportions necessary to accomplish the stain-preventing objectives of the invention. By contrast, ion exchange beads are not readily mixed and dispersed. The beads may upset the dispersant and water balance of the system. The dispersed cross-linked polymer may be of such constitution that is capable of forming a continuous film whe deposited at elevated temperatures or if the deposit thereof is subsequently heated. Generally this condition occurs only when the cross-linker is employed in the lower portion (e.g., about 1 to 2.5%) of the permissible range stated hereinabove. The cross-linked polymer is in most instances capable of forming a continuous film even at elevated temperatures and is in the form of distinct particles in the dried or dried and cured coatings of the first general embodiment of the present invention. It has been found that the stain prevention is obtained even when the deposit of cross-linker in the coating is in the form of a continuous film which is more or less compatible with the film produced by the binder proper or a portion of it if it contains a mixture of the water-insoluble vinyl addition binder polymer above-mentioned with other binder components mentioned hereinafter.

The emulsion polymerization of the several monomers needed to produce the small particle size of cross-linked copolymer is carried out under neutral or, in some cases, acid or alkaline conditions with alkaline conditions being preferred and after emulsion polymerization, the dispersion may be changed in pH to provide whatever condition of neutrality, acidity, or alkalinity is desired.

The neutralization to a pH above 7, especially to a pH of 8 or higher, changes the amine salt and quaternary ammonium groups of the free base amine or the quaternary ammonium hydroxide form.

The emulsion copolymerization to form the cross-linked polyelectrolyte polymer is carried out with agitation at a temperature in the range of from 0° to 100° C., preferably from 15 to 80° C. in the presence of a free radical initiator as a polymerization catalyst. Peroxidic free-radical catalyst particularly catalytic systems of the redox type, are recommended. Such systems, as is well known, are combinations of oxidizing agents and reducing agents such as a combination of potassium persulfate and sodium meta-bisulfite. Other suitable peroxidic agents include the "persalts" such as the alkali metal and ammonium persulfates and perborates, hydroxen peroxide, organic hydroperoxides such as *tert*-butyl hydroperoxide and cumene hydroperoxide, and esters such as *tert*-butyl perbenzoate. Other reducing agents include thiourea, zinc formaldehyde sulfoxylate, water-soluble thiosulfates, hydrosulfites, tertiary amines such as triethanolamine, and the salts, such as the sulfates, of metals which are capable of existing in more than one valence state such as zinc, cobalt, iron, nickel and copper. The amount of catalyst can vary but for purposes of efficiency from 0.01 to 3.0%, based on the weight of the monomers, of the peroxidic agent and the same or lower proportions of the reducing agent are recommended. In this way it is possible to prepare dispersions which contain as little as 1% and as much as 60% or even more of the resinous copolymer on a weight basis. It is, however, preferred to produce dispersions which contain about 30 to 55% resin-solids.

If desired, an emulsifier in an amount up to 20%, preferably up to about 15%, based on the weight of monomers, may be present during the polymerization. A nonionic emulsifier may be used in all cases. When the monomers include an amine or quaternary ammonium compound, a cationic emulsifier may be used alone or in conjunction with one of nonionic type.

Suitable cationic dispersing agents include lauryl-pyridinium chlorides, cetyl dimethyl amine acetate and alkyl-dimethylbenzylammonium chlorides in which the alkyl group has from 8 to 18 carbon atoms, such as octyl, decyl, dodecyl, or octadecyl, *t*-octylphenoxyethoxyethoxydimethylbenzylammonium chloride.

Suitable nonionic dispersing agents include the following: alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, *t*-dodecyl, and the like mercaptans or with alkylthiophenols having alkyl groups of 6 to 15 carbon atoms; ethylene oxide derivatives of long-chained carboxylic acids, such as lauric, myristic, palmitic, oleic, and the like or mixtures of acids such as found in tall oil containing 6 to 60 oxyethylene untis per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan comostearate containing 6 to 10 oxyethylene units, etc.; also ethylene oxide condensates of long-chain or branched-chain amines, such as dodecylamine, hexadecylamine, and octadecylamine, containing 6 to 60 oxyethylene groups, block copolymers of ethylene oxide and propylene oxide comprising a hydrophilic ethylene oxide section combined with one or more hydrophilic ethylene oxide sections.

The particle size of the dispersed cross-linked polymer is in the range of from 0.05 to about 0.3 microns. It may have the same particle size and distribution as the vinyl addition binder polymer or its average particle size may be less than or greater than that of the dispersed vinyl addition binder polymer. As contrasted with a product produced by a suspension polymerization such as an ion exchange bead, the products of this invention are stable and do not sediment on standing when mixed with the vehicle.

An aqueous dispersion of a cross-linked water-insoluble copolymer containing amine groups may be reacted with an alkylating agent of the class mentioned hereinabove and thereby converted to an aqueous dispersion of a similar copolymer except that it contains quaternary ammonium groups instead of some or all of the amine groups.

The binder of the aqueous coating composition of the first general embodiment of the present invention may consist entirely of one or more of the uncross-linked vinyl addition polymers mentioned hereinabove or it may comprise a mixture of a predominant proportion thereof with one or more other binder materials. For example, the binder may comprise more than 50% by weight of the dispersed addition polymer with less than 50% by weight of another binder material such as an alkyd resin, an aminoplast resin, resin-forming polyepoxide, a proteinaceous material such as casein, or an amylaceous material, such as starch or its derivatives. The binder may, of course, comprise a mixture of at least 50% by weight of one or more of the dispersed vinyl addition polymers with a mixture of at least 50% by weight of one or more of the dispersed vinyl addition palymers with a mixture of two or more of the other binder materials just mentioned, the total of the latter amounting to less than 50% by weight of the total binder.

In the second general embodiment, the linear or cross-linked polyelectrolyte polymer (B) is prepared by an emulsion polymerization procedure so that the polymer thereby produced is stably dispersed in the aqueous polymerization medium at concentrations in the range of 10% to 60% solids or higher. Such a stable dispersion can readily be mixed (either before or after partial or complete neutralization of the polymer therein with the acid or acid salt capable of generating metal-containing counterions, or before or after quaternization and such neutralization when the polyelectrolyte contains amine groups which it is desired to convert to quaternary ammonium groups) with the aqueous dispersion of the binder in the proper proportions necessary to accomplish the stain-preventing objectives of the invention. The dispersed linear or cross-linked poly-electrolyte polymer may be of such constitution that it is capable of forming a continuous film when deposited at elevated temperatures or if the deposit thereof is subsequently heated. Generally this condition occurs only when the cross-linker is not included or is employed in the lower portion (e.g., about 1 to 2.5%) of the permissible range stated hereinabove. The polyelectrolyte polymer is in most other instances incapable of forming a continuous film even at elevated temperatures and is in the form of distinct particles in the dried or dried and cured coatings of the present invention. It has been found that the stain prevention is obtained even when the deposit of polyelectrolyte in the coating is in the form of a continuous film which is more or less compatible with the film produced by the binder proper or a portion of it if it contains a mixture of the water-insoluble vinyl addition binder polymer above-mentioned with other binder components mentioned hereinafter.

This embodiment comprises an aqueous coating composition of a mixture of:

1. A binder comprising a stable aqueous dispersion of a water-insoluble addition polymer, the dispersed particles of which have a size in the range of 0.05 to 1.0 microns, selected from the group consisting of vinyl ester polymers, acrylic and methacrylic ester polymers and vinylhydrocarbon polymers, and 2. From 1 to 50% by weight, based on the weight of binder, of a stably dispersed water-insoluble, linear vinyl addition emulsion copolymer, the dispersed particles of which have a size in the range 0.05 to 1.0 microns, of a mixture of (a) 1 to 15% by weight of one or more monoethylenically unsaturated monomers containing an amine or quaternary ammonium group in base or salt form, (b) from 0 to 2.5% by weight of one or more cross-linking polyethylenically unsaturated monomers and (c) the balance to make 100% of one or more monoethylenically unsaturated monomers of neutral or non-ionic character, the non-volatile content of the composition being from about 30% to 70% by weight.

The emulsion polymerization of the several monomers needed to produce the cationic copolymer may be carried out, as stated previously, under neutral or, in some cases, acid or alkaline conditions with the preference being for alkaline conditions and after polymerization, the dispersion may be changed in pH to provide whatever condition of neutrality, acidity, or alkalinity is desired.

The neutralization to a pH above 7, especially to a pH of 8 or higher, changes the amine salt and quaternary ammonium groups to the free base amine or the quaternary ammonium hydroxide form. Such conversion to basic condition may, in those instances where a neutralized or acid form of the polyelectrolyte is obtained which lacks the proper metal-containing counterions required for the second general embodiment of the present invention, be a suitable step preliminary to partial or complete neutralization with an acid or acid salt having an appropriate metal-containing counterion.

In some instances, it is desirable to have the metal-containing counterion present in an amount equivalent to the total amount of basic groups in the polyelectrolyte polymer or even in excess thereof. In other instances, it has been found most desirable to have the amount of metal-containing counterions sufficient to neutralize groups in the polyelectrolyte only partially, such as from 50 to 60%, as in the instance of chromium containing counterions, e.g. those derived from chromic acid or the like.

The polyelectrolyte polymer containing amine and/or quaternary ammonium groups may be reacted with any of the acids or acid salts having metal-containing counterions to provide a polyelectrolyte polymer suitable for mixture with a binder polymer to make the stain-resistant compositions of the present invention. The reaction occurs upon the addition of the acid or acid salt to the polymer dispersion even at room temperature though elevated temperatures up to 50° C. may be used.

The main binder of the aqueous coating compositions of the second general embodiment of the present invention may consist entirely of one or more of uncross-linked vinyl addition polymers mentioned hereinabove or it may comprise a mixture of a predominant proportion thereof with one or more other binder materials. For example, the binder may comprise more than 50% by weight of the dispersed addition polymer with less than 50% by weight of another binder material such as the above-mentioned polyelectrolyte copolymer containing amine and/or quaternary ammonium group when such copolymer is of film-forming character, an alkyd resin, an aminoplast resin, a resin-forming polyepoxide, a proteinaceous material, such as casein, or an amylaceous material, such as starch, or its derivatives. The binder may, of course, comprise a mixture of at least 50% by weight of one or more of the dispersed vinyl addition polymers with a mixture of two or more of the other binder materials just mentioned, the total of the latter amounting to less than 50% by weight of the total binder.

It has been found that under severe humidity conditions, the first general embodiment (A) may be inadequate to prevent appreciable staining, such as when a water-based topcoat dries slowly because of high humidity in the ambient atmosphere or when excessive moisture passes through the wood substrate to the coating thereon.

It has now been found that the stain-resistance of aqueous coating compositions is greatly improved, even under the severe conditions mentioned when the coating compositions contain not only a water-insoluble vinyl addition emulsion copolymer of cross-linked character having amine or quaternary ammonium groups, but also certain metal containing counterions in an amount equivalent to at least about 50% of the amine and/or quaternary ammonium groups in the polyelectrolyte. In this embodiment a linear type of copolymer containing amine or quaternary ammonium groups may be used instead of the cross-linked type used also in the first general embodiment of the present invention. Thus, in this modification, herein referred to as the second general embodiment of the present invention, there is included within the coating composition, (a) a main binder; (b) 1 to 50% by weight, based on the total weight of binder, of a dissolved or dispersed, linear or cross-linked, water-insoluble vinyl addition copolymer containing units of (1) about 5 to 70%, preferably 25 to 50% by weight of at least one monomer containing an amine or quaternary ammonium group in salt or hydroxy form; (2) optionally about 1 to 50%, preferably about 3 to about 20% by weight of at least one cross-linking monomer of polyethylenically unsaturated character, and (3) 0 to about 89% by weight (to make 100%) of at least one monoethylenically unsaturated monomer of neutral or nonionic character and having a group of the formula $H_2C=C<$, the salt form being of such constitution that it comprises certain metal containing counterions in aqueous media.

Suitable counterions include those derivable from any acid or acid salt which is capable of ionizing in aqueous media to form an ion which contains a polyvalent metal, the most important of which are boron, chromium, molybdenum, and tungsten. In general, it appears that the effectiveness of these anions is attributable to the capability of the ion to form a complex having a chelating action. The following acids (or anhydrides), salts, or acid salts are examples of compounds from which the counterions may be derived: chromic acid, chromic oxide ($CrO_3$), sodium acid chromate ($NaHCrO_4$); potassium acid chromate, potassium or sodium dichromate, sodium silicochromate, strontium chromate, molybdic acid or molybdenum oxide, sodium acid molybdate, sodium molybdosilicate, tungstic acid or oxide, metatungstic acid, paratungstic acid, molybdoboric acid, molybdochromic acid, tungstoboric acid, tungstochromic acid, and tungstosilicic acid, boric acid or oxide and metaboric acid.

Counterions from all of the above-named sources are quite effective. Those containing boron are especially useful in certain situations because they are generally less toxic and less expensive than those containing the other metals. Also, discoloration and oxidation problems are generally of minimal character when the counterions contain boron rather than the other metals mentioned.

The cross-linked copolymer polyelectrolyte for the second general embodiment may be made in the same way and from the same monomers as hereinbefore set out for the preparation of the polyelectrolyte to be used in the first general embodiment. However, the cross-linking monomer may be omitted or reduced to an amount that would be insufficient to make the resulting polyelectrolyte insoluble in water, the insoluble character needed in the dried coating obtained from the composition being in such cases obtained from the cross-linking resulting from counterions of polyvalent type.

The polyelectrolyte in the second general embodiment of the present invention exists in the coating composition as a polymer containing either amine groups or quaternary ammonium groups or both, at least 10%, and preferably at least about 50% of which are in the form of a salt having certain metal-containing counterions. This polymer salt may be preformed before it is added to the coating composition or it may be formed in situ in the coating composition from (1) a polymer containing units having an amine or quaternary ammonium group and (2) an acid, salt, or an acid salt having the appropriate metal-containing counterions as a result of the addition of the polymer and the acid, salt, or acid salt to the coating composition wherein reaction between the two occurs. The polyelectrolyte salt having the metal-containing counterion can be formed in situ by adding the polymer having amine or quaternary ammonium groups or both to the aqueous coating composition and adding the appropriate acid, salt, or acid salt having the metal-containing counterion to the aqueous coating composition either before or after or concurrently with the polyelectrolyte.

GENERAL DISCUSSION OF USES AND ADVANTAGES OF THE GENERAL EMBODIMENTS

It has been found that the application to woods such as cedar, redwood, and mahogany of one or two coats of an aqueous composition within the scope of either of the general embodiments of the present invention (whether clear or pigmented) which contains the linear or cross-linked amine or quaternary ammonium polymer is adequate to largely inhibit or completely prevent the staining of the coating obtained by the composition itself or of subsequently applied aqueous coating compositions which need not contain the cross-linked polymer dispersed therein. The cationic type having quaternary ammonium groups are especially effective and when they are associated with counterions containing boron, chromium, molybdenum, and tungsten, the compositions containing them have improved effectiveness when subjected to some extreme conditions of humidity. While it is not intended to be limited to any theory of operation, it is believed that various woods contain phenolic compounds, such as catechol and tannins, and these substances, because of their water-solubility or water-sensitivity, tend to be leached out of the wood when aqueous coating compositions are applied and thereby cause staining of the coating applied initially as well as subsequent coats of materials deposited by application of aqueous systems. While all woods are believed to contain such staining components, the colored woods contain them in greater concentrations and therefore give rise to more severe staining.

Apparently, the staining compounds are somehow adsorbed on the amine-containing or quaternary ammonium-containing addition polymer either by chemical reaction or by some variety of ion-exclusion or hydrogen bonding. The special counterions present in the second general embodiment may also assist by playing some part in somehow chelating or complexing with the staining elements. Without the polymer of cationic character in the coating composition, the discoloration caused by the staining components of the wood is evident in the coatings applied initially even when as many as three or four coatings are placed on the wood substrate. Furthermore, in such instances if the coated substrate is spotted with water (and this may be done manually or it may be the result of a light rain when the painted wood is weathered), the staining components of the wood substrate leach through the coatings and dark spots appear on the surface as a result. By incorporating the polyelectrolyte polymer in accordance with the present invention, it has been found surprisingly that both the initial discoloration and the subsequent discoloration that would normally occur on water-spotting are greatly reduced and in most instances completely prevented. The metal-containing counterions enhance the stain-resistance especially in high humidity conditions, apparently operating in some way that is not understood. Possibly, there are discoloring ions, as of iron, in the staining compounds which are chelated by the counterions. The minimum amount of such polymer required in the coating composition that is employed as the primer coat depends upon the particular wood and the particular cationic polymer since it has been found that the various woods have various staining tendencies and, of course, various cationic polymers have varying effectiveness. In general, the use of at least 2% of cationic polymer based on the weight of binder shows a definite improvement and amounts in the range of about 10 to 20% of the cationic polymer is generally completely effective to prevent staining even when the coating composition is used as a single priming coat under subsequent coats of composition in which no cross-linked polymer is present. More than 20% and up to 50% by weight of the cationic polymer may be employed, but generally the use of more than 20% is not accompanied with any proportionate benefits except in unusual situations.

The compositions of the present invention containing the amine or quaternary ammonium copolymers, especially those that are cross-linked, are also useful in making water-base paints, such as semigloss paints, which are to be applied as interior paints. When aqueous base paints heretofore used were applied to walls or ceilings which are subjected to high humidity atmospheres, as in bathrooms, shower-rooms, and kitchens, it has been found that staining matter in the plaster substrate is often brought to the surface of the paint coating, apparently as a result of condensation penetrating the paint and leaching soluble staining matter from the coated substrate or from the paint itself. The cross-linked copolymers containing quaternary ammonium groups and the at least partially neutralized metal-containing counterion salts of the copolymers containing quaternary ammonium groups are generally the most effective.

The vinyl addition polymer binder employed in the system generally has a minimum film forming temperature (MFT) at the prevailing ambient temperatures or below so that there is no need to heat the coating to form a continuous film on the coated substrate. However, the vinyl addition polymer component of the binder may have a higher MFT such as 35 to 50° C. or higher, in which case a plasticizer may be employed in the composition if the coating is to be carried out at normal room temperature or temperatures below the MFT. However, in manufacturing operations where panels of the substrate material such as strips of siding material of cedar, redwood, or the like, may be transported through an oven in the manufacturing plant, a harder finish may be applied by employing the composition in which the polymer has a higher MFT without a plasticizer or with much less thereof than would be needed if no heat were employed. In this instance, the temperature of the oven through which the coated substrates are passed may be raised to the minimum film-forming temperature or higher to assure that a continuous film is produced. In any such operation where heat is employed, the temperature should not exceed that at which the binder of the cross-linked polymer contained within the coating composition is decomposed.

The aqueous compositions may contain additional materials (besides the binder and the linear or cross-linked cationic polymer) of various kinds to vary the properties and to adapt the compositions for various uses. As mentioned already, plasticizers may be added. In making water-base paint, incorporation of pigments and/or dyes is important. The relative proportions of binder to pigment may fall in a wide range, such as from a ratio of 1:20 to 20:1 but for most purposes is from 1:5 to 5:1.

Pigment compositions used in interior and exterior house paints usually comprise hiding white pigments, other tints and colors ordinarily being obtained by mixing other colored paint pigments with the white pigments. Any of the inorganic and organic pigments, pigment lakes, insoluble dyes and other durable coloring matter ordinarily used in formulating durable exterior paints, varnishes, enamels and lacquers can be used in pigmenting the invention paint compositions. Typical useful white hiding pigments are: rutile titanium dioxide, anatase titanium dioxide, zinc oxide, leaded zinc oxide, zinc sulfide, lead titanate, antimony oxide, zirconium oxide, white lead, basic lead silicate, lithopone, titanated lithopone, titanium-barium pigment, titanium-calcium pigment and titanium-magnesium pigment. The titanium dioxide pigments ordinarily are preferred. If pigments which are slightly soluble are used in the second general embodiment, the metal-containing counterions which serve to partially neutralize the basic polyelectrolyte polymer may be derived from the pigment when it is incorporated in the composition. Examples of such pigments are barium metaborate, strontium chromate, zinc chromate and lead silicochromate which provide the following counterions: metaborate, chromate, chromate, and silicochromate.

While the indicated pigmentation can be solely of hiding prime pigments, it is economically impractical to use solely prime pigments at high pigment volume concentration. As is ordinarily practice in paint formulation, the total pigment usually consists of hiding prime pigments extended with well-known pigment extenders such as calcium carbonate, gliders whiting talc, barytes, magnesium silicates, aluminum silicates, diatomaceous earth, china clay, asbestine, silica and mica. The relative proportions of the prime white pigment and the pigment extender in the pigment mixture may be varied widely, but usually the hiding prime pigment is present at a pigment volume concentration which provides the desired paint covering power or hiding and the extender pigment is present in an amount which provides the paint with the desired total pigment volume concentration. Prime pigments and extender pigments range widely in density, but ordinarily white house paints and light tints thereof have a pigment composition whereof the extender pigment is present in the weight proportion of 0.4 to 4 parts per part of hiding prime pigment.

Pigments can be dispersed in the aqueous paint vehicle by any of the well-known techniques of pigment dispersion in paint formulation, such as roller milling, ball or pebble grinding, sand grinding as described in Hochberg U.S. Pat. 2,581,414, paddle-mixer dispersion techniques, Werner Pfleiderer "dough" mixer and other pigment paste techniques. The pigments can be wet and dispersed in a separate aqueous slurry and then combined with the aqueous dispersion of polymer binder by simple mixing. The order of combining the pigments is not significantly critical. The pigment composition is preferably dispersed in the presence of a water-soluble and swellable colloidal bodying agent and an auxiliary surfactant in addition to the surfactants present in the respective latices to stabilize the polymer dispersions. The auxiliary surfactant for dispersing the pigment composition can be nonionic, anionic, or cationic, preferably of the water-soluble type. Phosphate ester pigment dispersants are found to be if particular value. The selection of this dispersing surfactant is judicious to provide compatibility and nonreactivity with the dispersion stabilizing surfactants of the respective aqueous dispersions of the paint vehicle. The surfactant for dispersing the pigment composition may be the same or different from the stabilizing surfactants of the polymer binder. Ordinarily, a concentration of up to 2% of the auxiliary pigment dispersing surfactant based on the weight of the pigment composition is adequate, the preferred concentration being 0.1% to 1% on the indicated basis. It is preferred that the total amount of pigment dispersing surfactant and the stabilizing surfactants of the respective latices does not exceed 10% based on the total weight of the binder.

The rheological characteristics of the paint can be varied to suit the application needs.

Water-soluble cellulose derivatives such as methyl cellulose, carboxymethyl cellulose or hydroxyethyl cellulose, especially methyl cellulose, can be used for bodying purpose. These materials are used in their ordinary small effective proportions.

Another desirable ancillary component which is preferentially present in the aqueous dispersion paint composition is a volatile water-soluble organic anti-freeze agent to provide the aqueous paint with freeze-thaw stability. Ethylene glycol is especially useful for this purpose at concentrations up to about 5% by weight of the total composition. Other glycols and polyglycols can be used for this purpose.

Aqueous dispersion paint compositions containing surfactants ordinarily foam unless selection of the dispersants is specifically directed to the inherently nonfoaming species. Anti-foam agents may be included in the aqueous paint formulation to minimize foaming. High boiling alcohols, polyglycols, silicone liquids and other anti-foam agents well-known to the coating art can be included in the composition as an ancillary component.

As with conventional paints and enamels formulateed from drying oils and from alkyd resins, the paints coalesced from the invention composition may exhibit fungus attack, and therefore, it is further desirable to include a preservative or fungicidal agent in the paint. Any of the well-known preservative agents used in paint formulations can be used in their usual small effective proportions. Phenyl mercury oleate and other phenyl mercurial fungicides are especially useful at active concentrations from 0.05 to 0.3% by weight of the composition.

The paint compositions of this invention ordinarily are adequately flexible so that the external plasticization of the polymer binder is unnecessary. However, ancillary plasticizer can be included in the composition in a minor proportion up to 10% by weight of the polymer binder, preferably no more than 5%. Non-volatile ester plasticizers, for example, the phosphates, such as tricresyl phosphate, and the phthalates, such as dibutyl phthalate, or the polymeric polyester or alkyd plasticizers can be used.

While the total non-volatile content of the aqueous dispersion paint composition, ordinarily designated as the solids content, can vary widely, it is desirable that the non-volatile content be at least 30% by weight in order that a practical amount of paint per coat is applied. The aqueous paint can be satisfactorily formulated in a non-volatile content as great as 70%, but at this concentration thinning with water is ordinarily necessary for satisfactory application. The preferred non-volatile content is from about 40% to 60% by weight.

The viscosity of the aqueous dispersion paint composition also can be varied widely. A Stormer viscosity of about 70 to 100 K.U. at 25° C. is a desirable ready-to-apply brush consistency. This is not a critical characteristic as the paint can be further modified satisfactorily with thixotropy controlling agents to provide the composition with non-drip characteristics with adequate brush-out characteristics.

Other auxiliary materials that may be used include: dispersing agents for dispersing and maintaining in a finely divided state the pigments, colors, or extenders, such as aromatic sulfonates condensed with formaldehyde or any of the suitable commercial dispersing agents which are available for this purpose, sequestering agents for controlling polyvalent metal ions sometimes introduced by pigments, colors, or extenders, such as complex alkali metal phosphates or ethylene polyaminoacetates, defoaming agents, including waxes, oils, or mineral spirits, or an alkylphenoxyethanol, fatty acid amides, phosphate esters, or a solution of an amine or amide in an oil; humectants, such as water-soluble gums, glycol laurate, propylene glycol, diethylene glycol, etc., thickeners, such as water-soluble gums, water-soluble cellulose ethers, e.g. hydroxyethyl cellulose, water-dispersed starches and proteins, etc.; bactericides and/or fungicides, such as borax, pentachlorophenols, or mercury compounds; perfume-like materials, including neutralizing and masking agents, which are used to overcome odors or to impart pleasant and distinctive odors; other resinous materials in dispersed form, such as alkyd resins, drying oils, or latices of styrene or of styrene and butadiene to cheapen and extend the binders of this invention, and auxiliary corrosion-inhibiting agents, such as sodium benzoate, guanyl urea phosphate, or sodium nitrite, in an amount of 0.05% to 5%, and most commonly 0.1% to 2% of the dispersed copolymer, etc. The use of sodium dichromate would also provide the metal-containing counterions of the second general embodiment herein.

The compositions of the present invention may be of strictly thermoplastic character or they may be of thermosetting character. The compositions may comprise auxiliary components which impart thermosetting qualities thereto. For example, there may be added an aldehyde, such as formaldehyde, an aminoplast or phenoplast, such as the resin-forming condensates of formaldehyde with phenol, urea, N,N'-ethyleneurea, 5-alkyl- or 5-hydroxyethyl triazones, aminotriazines, such as melamine, as well as the methylated derivatives of these condensates, poly(vic-epoxides) of aliphatic or aromatic types, alkyd resins, i.e. polyesters of polycarboxylic acids (e.g. phthalic, adipic, or sebacic) with a polyol (e.g. ethylene glycol, glycerol, trimethylolethane), and oil-modified types of alkyds containing from 25 to 60% of long chain fatty acid or ester (e.g. soybean oil). The content of these auxiliary materials may be from 1% to 35% by weight of the total weight of vinyl addition polymeric binder material.

When the thermosetting forms of the compositions of the present invention are used, the coating or impregnation may simply be dried at room temperature or whatever exterior temperature may prevail at the time as would be done with the simple thermoplastic types, reliance for development of cure being placed upon ageing for an extended period of time, e.g. several days, weeks, or in some cases, months. On the other hand, the cure of such films may be hastened by drying at elevated temperatures or heating at elevated temperatures (up to 200° C.) for several minutes to a half-hour after drying at room temperatures.

Compositions of the present invention are especially valuable for application to porous materials, e.g. textiles, paper, leather, wood of all types, and especially those having a tendency to stain, masonry, asbestos-cement shingles or siding, surfaces carrying chalky weathered oil-base paint or alkyd paint, and rusty and corroded metal surfaces, e.g. rusty iron, or corroded copper, zinc, and aluminum.

For making water-based paints to be applied by brushing as well as by spraying or roller coating, the preferred formulations generally fall within the scope of the following tabulation wherein the percentages indicate the solids content, the polyelectrolyte being in salt form having a counterion containing boron, chromium, molybdenum, or tungsten in the case of the second general embodiment.

| Material: | Percent by weight |
|---|---|
| Aqueous dispersed binder | 10 to 30 |
| Cationic polyelectrolyte | 0.5 to 10 |
| Pigment composition | 1.5 to 55 |
| Stabilizing and dispersing surfactants | 0.1 to 2.5 |
| Bodying or rheology control agent e.g. hydroxyethyl cellulose | 0 to 4.0 |
| Anti-freeze agent, e.g. ethylene glycol | 0 to 5 |
| Anti-foam agent, e.g. polypropylene glycol | 0 to 2 |
| Fungicidal preservative, e.g. phenyl mercurial salt | 0 to 1.0 |
| Ammonium hydroxide—to pH value 7.5 to 10. | |
| Water, balance to make 100. | |

The pigment volume concentration is preferably from 25% to 65%. The total of the dispersing and stabilizing surfactants is an amount no greater than 10% based on the weight of water-insoluble material in the binder.

The following examples illustrate the products of this invention and the emulsion polymerization conditions necessary to provide copolymers having a particle size of from 0.05 to 0.3 microns. It is to be noted that while the emulsion polymerization conditions disclosed afford polymers having a particle size falling within the range of from 0.05 to 0.3 microns that we have also discovered that the particle size within this range is agitation dependent. Increasing the rate decreases the particle size. Following quaternization, the final dispersion is stable for years to sedimentation and coagulation. The dispersions of this invention are also freeze-thaw, heat and shear stable.

EXAMPLE A

Preparation of cross-linked emulsion copolymer containing amine groups

A mixture of 191.7 g. dimethylaminoethyl methacrylate (DMAEMA), 188.0 g. methyl methacrylate (MMA), and 20.0 g. of ethylene glycol dimethacrylate (EGDM) is emulsified by stirring in 724 g. of water using 28.4 g. of 70% t-octylphenoxypoly(40)-ethoxyethanol ($OPE_{40}$) as the emulsifier. The temperature of the emulsion was reduced to 15° C. Then 32 ml. of 15% sodium formaldehyde sulfoxylate (SFS), 120.0 ml. of 1% potassium persulfate (KPS), 11 ml. of 1% Versene (V), (sodium ethylenediamine tetraacetic acid) and 10.0 ml. of 1% $FeSO_4 \cdot 7H_2O$ (FS) are added with stirring. The temperature rises to 45° C. after 16 minutes at which time 1.5 ml. of 60% t-butylhydroperoxide (t-BHP) and 1.5 ml. of 1% SFS are added. Four minutes later with the temperature at about 47.5° C., 0.5 ml. of 60% t-BHP and 0.5 ml. of 5% SFS are added and the dispersion is held at 50° C. for a half hour.

A mixture of 191.7 g. DMAEMA, 188.0 g. MMA, and 20.0 g. EGDM is emulsified in 100 g. water with 28.4 g. of 70% $OPE_{40}$. This mixture is added with stirring to the dispersion which is then cooled to 23° C. Then 32.0 ml. 5% SFS, 120.0 ml. 1% KPS, 11.0 ml. V, and 10.0 ml. FS are added. Five minutes later, the temperature being at about 41.5° C., 1.5 ml. 60% t-BHP and 1.5 ml. 5% SFS are added. Again 5 minutes later, the temperature being about 46° C., 0.5 ml. 60% t-BHP and 0.5 ml. 5% SFS are added with stirring and the mixture is allowed to cool for 3 hours. A dispersion, having a pH of 8.9 and a polymer solids content of 37.76% (total solids 40.16%), of a copolymer of about 48% DMAEMA, 47% MMA, and 5% EGDM is thereby obtained.

EXAMPLE B

Preparation of cross-linked emulsion copolymer containing quaternary ammonium groups A solution of 92.8 g. of 70% t-octylphenoxypolyethoxyethanol ($OPE_{40}$) in 1300 g. deionized water is prepared. Next a solution of 312.0 g. dimethylaminoethyl methacrylate (DMAEMA), 240.5 g. methyl methacrylate (MMA), and 97.5 g. ethyleneglycol dimethacrylate (EGDM) is prepared. The solution of monomers is added to the surfactant solution above with stirring, then the temperature is adjusted to 17° C. The polymerization is initiated by the addition of 156 g. of 1% sodium persulfate (NaPS), 111 g. of 1% sodium hydrosulfite, and 13.0 ml. of a mixture of 16.5 ml. 1% Versene tetrasodium ethylenediamine tetraacetate and 15 ml. of 1%

$$FeSO_4 \cdot 7H_2O$$

The temperature rises to 47° C. after 25 minutes at which time 0.4 ml. of 55% t-butyl-hydroperoxide is added and the dispersion is held at 45–47° C. for 15 minutes. The dispersion is then cooled to 40° C., 7 ml. of 5% sodium formaldehyde sulfoxylate is added, and the dispersion is held at 38–40° C. for 17 minutes, then cooled and filtered through 4-ply cheesecloth. A dispersion having a pH of 8.75 and a solids content of 31.5% of a copolymer of about 48% DMAEMA, 37% MMA, and 15% EGDM is thereby obtained.

A 712 g. portion of the 31.3% solids dispersion is diluted with 288 g. of water to give 1000 g. of a 22.3% solids dispersion containing 0.62 milliequivalent of amine per gram of dispersion determined by titration. Then 374 g. of a 10% aqueous acetic acid solution (620 meq.) and 28.5 g. (650 meq.) of ethylene oxide are prepared for addition to the above dispersion. At 24° C., the addition of ethylene oxide is started at pH 8.7. After 40 minutes with the pH at 9.0 and the temperature at 26.4° C. the addition of the acetic acid solution is started. After 115 minutes, all of the ethylene oxide and 158 g. of the acetic acid solution had been added, the pH is 8.8, and the temperature 34.7° C. After 15 minutes, 250 ml. of water is added. The remainder of the acetic acid solution is added over an additional 40 minutes, the pH being 5.3 and the temperature 32.8° C. The system is stirred an additional 17 hrs. at ambient temperature. The solids content of the final dispersion of (methacryloxyethyl)hydroxyethyl dimethyl ammonium acetate copolymer is 15.3%, the pH 6.0, and titrimetric analysis shows 100% quaternization.

EXAMPLE C

By replacing the DMAEMA with a corresponding amount of 4-vinylpyridine in the procedure of Example A, an aqueous dispersion, having a pH of 8.0 and a polymer solids content of about 38%, of a copolymer of about 48% vinyl pyridine, 47% MMA and 5% EGDM is obtained.

EXAMPLE D (a) The polymer in the dispersion obtained in Example A is quaternized with ethylene oxide as follows:

The polymer dispersion (100 g.) is neutralized with about 0.4 equivalent (relative to amine content of the copolymer) of acetic acid (2.77 g.) dissolved in 149 g. of water. Then 5.079 g. (approximately 1.0 equivalent relative to amine content of the copolymer) of ethylene oxide is added to the neutralized dispersion in an autoclave over a period of 80 minutes during which the temperature rises from 25° C. up to a temperature of 28° C. The resulting polymer dispersion has a pH of 11.5 and the amine groups are 48% quaternized.

(b) The procedure is the same as in (a) except that the copolymer of Example C is used, 5.54 g. of acetic acid is used, giving a marked viscosity increase before the ethylene oxide is added (7.64 g.) and the reaction is allowed a period of 24 hours. The resulting dispersion has a pH of 6.6 and 86% of the amine units of the polymer are quaternized.

EXAMPLE E

The procedure of Example D (a) is followed except the acetic acid is omitted and the ethylene oxide is replaced by 14.4 g. of 1,4-dichlorobutene-2 (an amount approximately equivalent to the amine content of the copolymer).

EXAMPLE F

The procedure of Example D (b) is followed execpt the acetic acid is omitted and the ethylene oxide is replaced by 22.0 g. of benzyl chloride (an amount approximately equivalent to the copolymer amine content).

EXAMPLE G

The polymer in the dispersion obtained in Example A is quaternized with ethylene oxide as follows:

(a) To the polymer dispersion (100 g.) is added gradually 5.079 g. of ethylene oxide and the pH observed. When the pH begins to rise above the initial level (8.5) a 20% aqueous solution of $CrO_3$ is added to maintain a pH level of 8.5–9.5 until 5.8 g. (an equivalent of the polymer amine content) of $CrO_3$ has been added, the final pH being about 8.0–8.5.

(b) The procedure is the same as in part (a) except that addition of the aqueous $CrO_3$ solution is started prior to the starting of the addition of ethylene oxide. The final pH is about the same as in part (a).

(c) The procedure is the same as in part (b) except that all of the ethylene oxide is added prior to the addition of $CrO_3$.

EXAMPLE H

The same procedure as in Example G (a), G (b), and G (c), is used except that 81.5 g. of a 20% aqueous solution of $ZnCr_2O_7$ is substituted for the $CrO_3$ solution.

EXAMPLE I

The same procedure as in Example G (a), G (b), and G (c) is used except that 13.5 g. of powdered, solid tungstic anhydride is substituted for the $CrO_3$ solution.

EXAMPLE J

The same procedure as in Example G (a), G (b), and G (c) is used except that 8.3 g. of solid, powdered molybdic anhydride is substituted for the $CrO_3$ solution.

EXAMPLE K

The same procedure as in Example G (a), G (b), and G (c) is used except that 7.2 g. of powdered boric acid is substituted for the $CrO_3$ solution.

EXAMPLE L

A linear emulsion copolymer of 19% of dimethylaminoethyl vinyl sulfide, 60% of vinyl acetate, 5% methyl methacrylate, and 16% of dibutyl maleate of 40% solids is prepared, neutralized with acetic acid, and this linear copolymer is then reacted with 7.5 g. per 100 g. polymer dispersion of diglycidyl phthalate by holding the mixture of the phthalate in the polymer dispersion for 24 hours to effect cross-linking that assures insolubility in water. The resulting dispersion is diluted to 25% solids.

EXAMPLE M

To the dispersion of polymer obtained in Example D (a) in which the amine groups are 48% quaternized by ethylene oxide, there is added 3.9 g. of 1,4-dichlorobutene-2. The mixture is held at 35° C. for 24 hours and the remaining amine groups are essentially all alkylated to effect cross-linking of the copolymer by the alkylation agent in addition to that resulting from the copolymerization of EGDM.

EXAMPLE N

The procedure of Example B is followed except that the charges are changed to 208.0 g. MMA and 130.0 g. EGDM, all other charges remaining identical. The dispersion obtained is a copolymer of about 48% DMAEMA, 32% MMA and 20% EGDM. The particle size ranges from 0.1 to 0.18 microns in diameter.

EXAMPLE O

An emulsion copolymer of 48% 2-bromoethyl methacrylate and 52% methyl methacrylate or 40% solids is prepared, then reacted with 1.0 equivalent (relative to bromine in the copolymer) of N,N,N',N'-tetramethylethylenediamine by holding the mixture for 24 hours to effect crosslinking. The resulting dispersion is diluted to 25% solids.

EXAMPLE P

The procedure of Example D (a) is followed except the acetic acid is omitted and the ethylene oxide is replaced by one of the following:

(a) 11.0 g. of methyl bromide;
(b) 16.5 g. of methyl iodide and
(c) 14.7 g. of benzyl chloride.

EXAMPLE 1

A water-base paint of the present invention (herein designated Paint A) and a corresponding paint lacking the dispersed cross-linked polyelectrolyte (herein designated Control A) were prepared by mixing the materials listed in the following Table A in the amounts designated.

TABLE A

| Materials | Pounds | |
|---|---|---|
| | Paint A | Control A |
| Water | 30.0 | 30.0 |
| Sodium salt of 50:50 mole ratio maleic anhydride/diisobutylene copolymer (25% in water) | 8.6 | 8.6 |
| Benzyl ether of t-octylphenoxy-poly(15) ethoxyethanol | 2.5 | 2.5 |
| Nopco NXZ (Defoamer, optional) | 1.0 | 1.0 |
| Ethylene glycol | 20.0 | 20.0 |
| Pine oil | 3.0 | 3.0 |
| Metasol 57 (preservative, optional) | 1.8 | 1.8 |
| Hydroxyethyl cellulose (15,000 cps. grade, 2.5% solution in water) | 100.0 | 100.0 |
| Titanium dioxide (pigment grade) | 171.0 | 171.0 |
| Calcium carbonate (pigment grade) | 186.5 | 186.5 |
| Mica (325 mesh) | 30.0 | 30.0 |

The above ingredients are mixed and ground in a Cowles Dissolver at 3800–4500 ft./min. (f.p.m. peripheral speed) for 15 minutes; then let down with the following at low speed:

| | Paint A | Control A |
|---|---|---|
| Materials, pounds: | | |
| Aqueous dispersion (46% solids) of a copolymer of about 46% methyl methacrylate, about 53% butyl acrylate and about 1% methacrylic acid containing about 6%, on polymer, of t-octylphenoxypoly-(39) ethoxyethanol | 561.6 | 561.6 |
| Water | 7.2 | 7.2 |
| Cross-linked polymer dispersion of Ex. D (a) diluted to 15% | ᵃ 66.8 | |
| Tert-octylphenoxypoly(40)ethoxy ethanol | ᵃ 1.0 | |
| Nopco NXZ (defoamer, optional) | 1.0 | 1.0 |
| NH₄OH (28%) | 1.0 | 1.0 |
| | 1,193.6 | 1,125.2 |
| Pigment volume content, percent | 36 | 35 |
| Weight solids, percent | 55 | 57 |
| pH | 9.4 | 9.5 |
| Viscosity, Krebs units | 80 | 81 |

ᵃ Premixed.

The resulting composition is an excellent paint for priming wood surfaces, especially those of cedar, redwood, and others having a tendency to stain paint coatings applied thereto.

Each of these paints (A and Control A) was applied to several panels each of cedar and redwood. Some of the panels were air-dried and then tested for general staining and for water spotting. Others were first top-coated with a single coat of a commercial acrylic latex paint. Then the topcoated panels, after air-drying, were tested for general staining and for water-spotting. The results are as shown in the following Table B.

TABLE B

| | Primer | | Primer plus topcoat | |
|---|---|---|---|---|
| | General stain | Water spot stain | General stain | Water spot stain |
| Substrate—Cedar: | | | | |
| Paint A control | Yes | V. heavy | Yes | V. heavy |
| Paint A | Slight | Medium | No | Medium |
| Substrate—Redwood: | | | | |
| Paint A control | Yes | Heavy | Yes | Heavy |
| Paint A | Yes ¹ | do | Yes ¹ | Slight |

¹ Less than control.

EXAMPLE 2

A Control Paint B is made by the mixing of the ingredients listed under Control A in Table A except the first batch of water is reduced from 30 to 20 pounds, and the second batch of water is increased from 7.2 to 17.2 pounds. The resulting paint has a PVC of 34.3% and a 42 volume percent solids.

Two other paints B1 and B2 are made in the same way except that in making B1, 115.4 pounds of a 26% solids aqueous dispersion of an emulsion copolymer of about 48% DMAEMA, 37% MMA, and 15% EGDM, 85% quaternized with ethylene oxide is added during the let-down and in B2, 173.1 pounds of such 26% polymer dispersion is added during the "let-down."

Each of these paints (B1, B2 and Control B) is applied to several panels each of cedar and redwood. Some of the panels are air-dried and then tested for general staining and for water-spotting. Others are first top-coated with a single coat of a commercial acrylic latex paint. Then the topcoated panels, after air-drying, are tested for general staining and for water-spotting. The results are as shown in the following Table C.

TABLE C

| | Primer | | Primer plus topcoat | |
|---|---|---|---|---|
| | General stain | Water spot stain | General stain | Water Spot stain |
| Substrate—Cedar: | | | | |
| Paint B control | Heavy | Heavy | Heavy | Heavy |
| Paint B1 | Slight | Slight | Slight | Slight |
| Paint B2 | do | do | Nil | Nil |
| Substrate—Redwood: | | | | |
| Paint B control | Heavy | Heavy | Heavy | Heavy |
| Paint B1 | Slight | Slight | Slight | Slight |
| Paint B2 | do | do | Nil | Nil |

EXAMPLE 3

The materials above the line in Table D below are ground together at a high speed, 3800–4500 f.p.m. (feet per minute peripheral speed), and the mixture is then let-down with the material below the line.

TABLE D

| Ingredient: | Pounds |
|---|---|
| Water | 25.2 |
| Surfactant (Tamol 850, 30%) | 4.5 |
| NOPCO NXZ (Defoamer, optional) | 1.0 |
| Pine Oil | 3.0 |
| Ethylene glycol | 25.0 |
| Metasol 57 (Preservative optional) | 1.8 |
| Hydroxyethyl Cellulose (4400 cps. grade, 2% aqueous solution) | 162.5 |
| Basic lead silicate | 125.0 |
| TiO₂ | 150.0 |
| CaCo₃ | 108.1 |
| Aqueous dispersion (46% solids) of a copolymer of about 46% methyl methacrylate, about 53% butyl acrylate and about 1% methacrylic acid containing about 6%, on polymer, of t-octylphenoxypoly(39)ethoxyethanol | 561.6 |

The resulting composition, designated Control Paint C, amounts to about 100 gallons of paint and contains basic lead silicate, a known stain inhibitor used in paints. The stain resistance is improved by preparing a Paint D in the same manner as Control Paint C except that during let-down, 110 pounds of a 40% solids dispersion of the cross-linked polymer of Example F is added thereto. After topcoating cedar primed with these paints, it is found that Control Paint C provided only fair resistance to staining whereas Paint D shows very good stain resistance.

EXAMPLE 4

A semi-gloss white interior water-base paint is prepared by mixing 7.2 pounds of a 25% aqueous solution of the sodium salt of a 50:50 mole ratio maleic anhydride/diisobutylene copolymer (mol. weight about 4500) with 51.2 pounds of propylene glycol and optionally 2.1 pounds of a defoamer, e.g. Balab 748. Then 235.7 pounds of rutile titanium dioxide (pigment grade) is added at low speed, e.g. 1900 f.p.m. The speed of the mixer is increased to 5400 f.p.m. and the mixture is ground at that speed for 20 minutes. Then, the following is added at low speed, 1900 f.p.m.:

522 pounds of a 45% dispersion of an emulsion copolymer of about 66% ethyl acrylate, 32.5% methyl methacrylate, and 1.5% acrylic acid, 111.7 pounds of a 46% dispersion of an emulsion copolymer of about 42% ethyl acrylate, 55% methyl methacrylate, and 1% methacrylic acid,
9.3 pounds of a mixture of 6.2 pounds of 2-butoxyethanol, 1.0 pound of a phenyl mercury salt (Super-Ad-It), and optionally 2.1 pounds of a defoamer (Balab 748),
5.1 pounds of a 22% solution of an ammonium salt of about 55% ethyl acrylate and 45% methacrylic acid,
102.5 pounds of water, and
2 pounds of a 60% solution of di-capryl sodium succinate in a 50:50 weight ratio mixture of isopropanol and water,
19.2 pounds of a 26% aqueous dispersion of an emulsion copolymer of 37% methyl methacrylate, 48% DMAEMA, and 15% EGDM (the copolymer of Ex. B before quaternization).

The total weight of the batch is 1068.6 pounds and its volume is about 102 gallons.

When the paint prepared in this fashion is applied to the walls of rooms, such as bathrooms and shower-rooms, which are frequently subjected to high humidity, it has been found that, as compared to paints lacking the dispersed MMA/DMAEMA/EGDM copolymer, very little, if any, staining develops over a period of 12 to 24 months whereas the paint without such dispersed cross-linked polymers shows moderate to heavy staining in less than 12 months.

EXAMPLE 5

Example 1 is repeated except that the dispersed cross-linked polymer is replaced by the benzyl chloride quaternized emulsion copolymer of Example F. Good stain resistance is obtained.

EXAMPLE 6

Example 2 is repeated except that the dispersed cross-linked polymer is replaced by the 1,4-dichloro-butene-2-quaternized polymer of Example E. Good results in respect to resistance to staining is obtained.

EXAMPLE 7

Example 4 is repeated except that the dispersed cross-linked polymer is replaced by the emulsion polymer of Example C. Similar resistance to staining is obtained.

EXAMPLE 8

(a) Example 4 is repeated except that the dispersed cross-linked polymer is replaced by the quaternized polymer of Example D(a). Somewhat better resistance to staining is obtained in this case than in Example 7.

(b) Even better resistance to staining is obtained when the replacement is made with the quaternized polymer of Example D(b).

EXAMPLE 9

A water-base paint of the present invention (herein designated Paint Ea and a corresponding paint with a dispersed cross-linked polyelectrolyte but having no metal-containing counterion (Paint Eb) are prepared by mixing the materials listed in the following Table E1 in the amounts designated.

TABLE E1

| Materials | Pounds | |
|---|---|---|
| | Paint Ea | Paint Eb |
| Water | 30.0 | 30.0 |
| Sodium salt of 50:50 mole ratio maleic anhydride/diisobutylene copolymer (25% in water) | 12.0 | 12.0 |
| Benzyl ether of t-octylphenoxy poly(15)ethoxyethanol | 3.0 | 3.0 |
| Nopco NXZ (defoamer, optional) | 2.0 | 2.0 |
| Ethylene glycol | 25.0 | 25.0 |
| Titanium dioxide (pigment grade) | 200.0 | 200.0 |
| Silica | 47.3 | 47.3 |

The above ingredients are mixed and ground in a Cowles Dissolver at 3800–4500 ft./min. for 15 minutes; then let down with the following (Table E2) at low speed:

TABLE E2

| Materials | Pounds | |
|---|---|---|
| | Paint Ea | Paint Eb |
| Aqueous dispersion (46% solids) of a copolymer of about 46% methyl methacrylate, about 53% butyl acrylate and about 1% methacrylic acid containing about 6%, on polymer, of t-octylphenoxy poly(39)ethoxyethanol | 552.0 | 552.0 |
| Polymer dispersion of Example G(a) (29% solids) | 108.0 | |
| Polymer dispersion of Example D(a) (15% solids) | | 206.0 |
| Water | 98.0 | |
| Hydroxyethyl cellulose (15,000 cps. grade, 2.5% solution in water) | 50.0 | 50.0 |
| Super-Ad-It (preservative, optional) | 9.0 | 9.0 |
| | 1,136.3 | 1,136.3 |
| Pigment volume content | 23.1 | 23.1 |
| Weight solids | 44.4 | 44.4 |

Each of these paints is applied to several panels each of cedar and redwood, air-dried, and topcoated with a single coat of a commercial acrylic latex paint. One set of panels is dried at 100% relative humidity and 72° F. and the general staining noted. This involves unusually severe conditions and the results in Table F following show that the paint (Ea) having chromium-containing counterions (the second embodiment) survive these conditions in much better fashion than the other paint (Eb). Another set of topcoated panels is air-dried at 72° F. and 20% relative humidity and tested for general stain development on a blister box. This apparatus essentially consists of a test chamber with an open top on which the wood panels are mounted painted side up to form an enclosed cabinet. The lower portion of the cabinet contains water which is heated to maintain the air temperature inside the blister box at approximately 140° F. at 95 to 100% relative humidity. After 76 hours of exposure, the panels are rated for the degree of staining which develops as a result of the boards becoming saturated with water from the moist air inside the chamber. This is an extremely severe test, even more severe than that of the drying conditions at 100% relative humidity at 72° F. The results for the paints on the two sets of panels are shown in the following Table F:

TABLE F

| | General staining primer, topcoat | |
|---|---|---|
| | Paint Ea | Paint Eb |
| Dried at 100% R.H. and 72° F.: | | |
| Cedar substrate | None | Medium. |
| Redwood substrate | do | Do. |
| Blister box exposure for 76 hrs.: | | |
| Cedar substrate | Slight | Heavy. |
| Redwood substrate | do | Do. |

Similar results are obtained when in making Paint Ea, there is used a corresponding amount of a 29% solids polymer dispersion obtained in accordance with Example G(b) or Example G(c) instead of that of Example G(a).

EXAMPLE 10

A water-base paint of the present invention containing a polymer of Ex. D(b) (herein designated Paint F) and a corresponding paint (herein designated Control F) lacking the polymer of D(b) are prepared by mixing the materials listed in the following Table G, in the amounts designated.

TABLE G

| Materials | Pounds | |
|---|---|---|
| | Paint F | Control F |
| Water | 30.0 | 30.0 |
| Sodium salt of 50:50 mole ratio maleic anhydride/diisobutylene copolymer (25% in water) | 12.0 | 12.0 |
| Benzyl ether of t-octylphenoxy poly(15) ethoxyethanol | 3.0 | 3.0 |
| Nopco NXZ (defoamer, optional) | 2.0 | 2.0 |
| Ethylene glycol | 25.0 | 25.0 |
| Titanium dioxide (pigment grade) | 200.0 | 200.0 |
| Silica | 173.8 | 173.8 |
| Strontium chromate | 23.0 | 23.0 |

The above ingredients are mixed and ground in a Cowles Dissolver at 3800–4500 ft./min. for 15 minutes; then let down with the following (Table H) at low speed:

TABLE H

| Materials | Pounds | |
|---|---|---|
| | Paint F | Control F |
| Aqueous dispersion (40% solids) of a copolymer of about 46% methyl methacrylate, about 53% butyl acrylate and about 1% methacrylic acid containing about 6%, on polymer, of t-octyl phenoxypoly(39)ethoxyethanol | 552.0 | 552.0 |
| Polymer dispersion of Example D(b) (15% solids) | 206.0 | |
| Water or hydroxyethyl cellulose (15,000 cps. grade, 2.5% solution in water) | | 106.0 |
| Super-Ad-It (preservative, optional) | 9.0 | 9.0 |
| | 1,235.8 | 1,135.8 |
| Pigment volume content | 35.0 | 35.0 |
| Weight solids | 52.7 | 57.3 |

The paints prepared in this fashion are applied to cedar or redwood and subjected to the blister box test as described in Ex. 9.

Very little staining develops with Paint F containing the dispersed ethylene oxide quaternized 4-vinylpyridine copolymer, whereas control Paint F without such dispersed cross-linked polymer shows moderate to heavy staining. Leaving out the SrCrO₄ in Paint F also gives moderate to heavy staining in this test.

EXAMPLE 11

The materials above the line in Table J below are ground together at a high speed, 3800–4500 f.p.m., and the mixture is then let down with the material below the line.

TABLE J

| Ingredient: | |
|---|---|
| Water | 30 |
| Surfactant (Tamol 850, 30%) | 12 |
| Wetting Agent (Triton X–405) | 3 |
| Nopco NXZ (deformer, optional) | 2 |
| Ethylene glycol | 25 |
| TiO₂ | 150 |
| Silica | 67.5 |
| Barium metaborate | 15 |
| Aqueous (46%) polymer dispersion of a copolymer of about 46% methyl methacrylate, about 53% butyl acrylate and about 1% methacrylic acid containing about 6% on polymer of t-octyl phenoxypoly(39)ethoxyethanol | 552.0 |
| Hydroxyethyl cellulose (15,000 cps. grade, 2.5% solution in water) | 100.0 |

The resulting composition, designated Control Paint G, amounts to about 100 gallons of paint and contains barium metaborate, a known stain inhibitor used in paints. The stain resistance is improved by preparing a Paint G in the same manner as Control Paint G except that during let-down 208 pounds of a 15% solids dispersion of the cross-linked polymer of Example B is added thereto. Cedar primed with these paints is topcoated and dried at 100% relative humidity and 72° F. Control Paint G provides poor resistance to staining whereas Paint G shows very good stain resistance. When Paint G is prepared without barium metaborate and tested in a similar fashion, some staining develops under the high humidity conditions.

Comparable results may be obtained by preparing Paint G using 208 pounds of a 15% solids dispersion of an ethylene oxide quaternized polymer made in accordance with Example D (a) or D (b).

EXAMPLE 12

Example 9 is repeated except that the dispersed cross-linked polymer in Paint Ea is replaced by the ethylene oxide quaternized emulsion copolymer of Example H having counterions derived from ZnCr₂O₇. Good stain resistance is obtained.

EXAMPLE 13

Example 9 is repeated except that the dispersed cross-linked polymer in Paint Ea is replaced by the ethylene oxide quaternized emulsion polymer of Example I having tungstate counterions. Good results in respect to resistance of staining is obtained.

EXAMPLE 14

Example 9 is repeated except that the dispersed cross-linked polymer in Paint Ea is replaced by the ethylene oxide quaternized emulsion polymer of Example J containing molybdate counterions. Good stain resistance is obtained.

EXAMPLE 15

Example 9 is repeated except that the dispersed cross-linked polymer in Paint Ea is replaced by the ethylene oxide quaternized emulsion polymer of Example K containing borate counterions. Similar resistance to standing is obtained.

EXAMPLE 16

Example 11 is repeated except that the dispersed cross-linked polymer of Example B is replaced by the 1,4-dichlorobutene-2-quaternized polymer of Example E. Good stain resistance is obtained.

EXAMPLE 17

A paint is made up by following the procedure for making Paint Ea of Example 9 except that 20 parts of sodium silicochromate is mixed into the the first batch of ingredients listed in Table E1 and, in the let-down, instead of 108 pounds of the polymer dispersion of Example G(a) there is used 90 pounds of the 38% solids copolymer of Example A (48% DMAEMA, 47% MMA, and 5% EGDM). Good stain resistance is obtained.

EXAMPLE 18

A paint is made up by following the procedure for making Paint Ea of Example 9 except that 20 parts of sodium molybdosilicate is mixed into the first batch of ingedients listed in Table E1 and, in the let-down, instead of 108 pounds of the polymer dispersion of Example G(a) there is used 85 pounds of the 38% solids copolymer of Example C (48% 2-vinylpyridine, 47% MMA, and 5% EGDM). Good stain resistance is obtained.

EXAMPLE 19

A paint is made up by following the procedure for making Paint Ea of Example 9 except that 18 parts of sodium phosphomoylbdate is mixed into the first batch of ingredients listed in Table E1 and in the let-down instead of 108 pounds of the polymer dispersion of Example G(a) there is used 110 pounds of a 36% solids ethylene oxide quaternary copolymer obtained in Example D(b). Coatings on cedar and redwood show good stain resistance.

EXAMPLE 20

The procedure of Example 11 is followed except that in place of using the copolymer of Example B there is used 215 parts of a 37% solids dispersion of the benzyl chloride quaternary ammonium polymer of Example F.

EXAMPLE 21

Example 10 is repeated except that the 206 parts of the 15% solids polymer dispersion of Example D(b) is replaced by 200 parts of a 16% solids dispersion of a linear emulsion copolymer of 10% of N-(3-diethylaminopropyl)-methacrylamide, 20% styrene and 70% ethyl acrylate. Similar stain resistant results are obtained.

EXAMPLE 22

Example 4 is repeated with similar anti-staining results by replacing the 19.2 pounds of the 26% solids dispersion of the 48% DMAEMA copolymer with 20 pounds of the 25% solids dispersion obtained in Example L.

EXAMPLE 23

The procedure of Example 11 is followed except that in place of using the copolymer of Example B there is used 215 parts of a 25% solids dispersion of the quaternary ammonium copolymer of one of the following:
(a) Example N
(b) Example O
(c) Example P(a)
(d) Example P(b)
(e) Example P(c)

In each case, the paint containing the respective quaternary ammonium copolymer and the sodium metaborate shows greatly improved resistance to staining as compared to the corresponding controls when applied to redwood panels.

EXAMPLE 24

Example 3 is repeated except that the 561.6 parts of the acrylic polymer dispersion is replaced with 561.6 parts of a 46% solids aqueous dispersion of an emulsion copolymer of 70% vinyl acetate, 29% ethyl acrylate and 1% of methyl hydrogen itaconate. Similar results are obtained.

Example 3 is repeated except that the 561.6 parts of the a 46% solids aqueous dispersion of an emulsion copolymer of 30% styrene, 68% ethyl acrylate and 2% methacrylate acid. Similar reduction in staining is obtained.

EXAMPLE 25

Instead of the acids, salts and acid salts which provide counterions containing boron, chromium, molybdenum, and tungsten, there may be used the following acids or salts thereof including the salts named:

Titanic acid, potassium acid titanate, stannic acids, stannonic acids, acid sulfatostannates, tungstic acid, metatungstic acid, paratungstic acid, antimonic acid, metaantimonic acid, arsenic acid; various other acids including isopoly acids, such as hexaniobic acid, isopolytantalic acid, isopolyarsenic acid, isopolychromic acid, isopolymolybdic acid, isopolytungstic acid and isopolyvanadic acids or their anhydrides, such as pyrovanadic acid, metavanadic acid, pentavanadic acid, and tetravanadic acid; various other heteropoly acids, such as 12-tungstoboric acid (dodecatungstoboric acid), 12-tungstosilicic acid, 10-tungstosilicic acid, 12 - tungstophosphoric acid, 22-tungstodiphosphoric acid, 21 - tungstophosphoric acid, 18-tungstodiarsenic acid, 6 - tungstotelluric acid, 12 - molybdosilicic acid, 12 - molybdophosphoric acid, 18 - molybdodiphosphoric acid, 12 - molybdoarsenic acid, 18-molybdodiarsenic acid, 6-molybdodiarsenic acid, 12-molybdoperiodic acid, 48 - vanadodiphosphoric acid, 24 - vanadodiphosphoric acid, and the like.

When the list of acids above names a hypothetical acid it is of course understood that in the compositions of the present invention, a salt or anhydride of the acid is used.

The use of the stably dispersed emulsion polymers (A) and/or (B) defined on page 2 of this application is a distinct improvement over the use of ion-exchange granules called for by U.S. Pat. 3,494,878. The emulsion polymers are prepared in a stably dispersed form. They require no grinding to obtain the small particle sizes in the range of 0.05 to 0.3 microns whereas ion-exchange resins would require a prolonged, expensive step of grinding, even to attain as small a size as 5 microns. The emulsion polymers (A) and (B) or paints prepared with them have settling out problems whereas dispersions and paints made using the ion-exchange resins of U.S. 3,494,878 have strong tendencies to settle out. Dispersions and paints made from the polymers (A) and (B) of the present invention have improved characteristics, such as better continuity of film formation and are more readily formulated into suitable water base paints than the ion-exchange resins of said patent.

EXAMPLE 26

Stain Resistant Primer

| Material: | Pounds |
|---|---|
| Sodium Salt of the copolymer of maleic anhydride and diisobutylene (25%) water (75%) | 9.0 |
| 2-amino - 2 - methyl-1-propanol | 3.5 |
| Octylphenoxypolyethoxy ethanol ($EO_{9-10}$) | 4.0 |
| Water | 15.0 |
| Ethylene glycol | 35.0 |
| Defoamer | 2.0 |
| Titanium Dioxide | 144.0 |

Grind the above material in a high speed mill (Cowles, 3800 to 4500 feet per minute) for 10 to 15 minutes and letdown, at a slower speed, as follows, using the following order of addition:

| | |
|---|---|
| 45MMA/52BA/1MA/2 Hydroxyethyl Cellulose | 610.0 |
| Hydroxyethyl Cellulose | 25.0 |

| Material: | Pounds |
|---|---|
| Add with good agitation: | |
| Emulsion of Example N | 104.0 |
| Tributyl phosphate | 8.4 |
| Water | 11.9 |
| | 1021.8 |

Adjust the pH to 9.5–9.8 Ammonium Hydroxide (28%)
Physical Constants:

| | |
|---|---|
| Pigment Volume Content | 21.8%. |
| Volume Solids | 38.8%. |
| Initial Viscosity | 74KU. |
| Initial pH | 9.5. |
| Accelerated Stability (250 hours at 140° F.) Viscosity | 75KU. |
| pH | 9.5. |
| Roller Stability | 5 days min. |
| Freeze-Thaw Stability (5 cycles) | Pass. |

We claim:
1. An aqueous coating composition comprising
(1) a binder of a stable aqueous dispersion of a water-insoluble addition polymer, the dispersed particles of which have a size in the range of 0.05 to 1.0 microns, selected from vinyl ester polymers, acrylic and methacrylic ester polymers or vinylhydrocarbon polymers and
(2) from about 1 to 50% by weight, based on the weight of binder, of
(A) a sedimentation stably dispersed, cross-linked, water-insoluble vinyl addition emulsion copolymer, having a particle size in the range of 0.05 to 0.3 microns, of a mixture of
(a) from about 5 to 70% by weight of one or more monoethylenically unsaturated monomers containing an amine or quaternary ammonium group in base form,
(b) from about 1 to 50% by weight of one or more cross-linking polyethylenically unsaturated monomers having at least two non-conjugated points of ethylenic unsaturation and
(c) from 0 to about 89% by weight (to make 100%) of at least one monoethylenically unsaturated monomer of neutral or non-ionic character or
(B) a sedimentation stably dispersed, water-insoluble linear or cross-linked vinyl addition emulsion copolymer, having a size in the range 0.05 to 0.3 microns, of a mixture of

(a) from about 5 to 70% by weight of one or more monoethylenically unsaturated monomers containing an amine or quaternary ammonium group in salt form, the counterions of the salt being derived from boron, chromium, molybdenum or tungsten, (b) from 0 to 50% by weight of one or more cross-linking polyethylenically unsaturated monomers having at least two non-conjugated points of ethylenic unsaturation, and the balance (c) to make 100%, of one or more monoethylenically unsaturated monomers of neutral or nonionic character, the non-volatile content of the composition being from about 30 to 70% by weight.

2. A sedimentation stable aqueous coating composition adapted to inhibit staining by wood substrates which normally stain aqueous coating compositions applied thereto or to inhibit staining by components of the coating deposit that tend to stain under humid conditions comprising a mixture of (1) a binder comprising a sedimentation stable aqueous dispersion of a water-insoluble addition polymer, the dispersed particles of which have a size in the range 0.05 to 1.0 microns, selected from the group consisting of vinyl ester polymers, acrylic and methacrylic ester polymers, and vinylhydrocarbon polymers and (2) from 1 to 50% by weight, based on the weight of binder, of a stably dispersed, cross-linked, water-insoluble vinyl emulsion copolymer, the dispersed particles of which have a size in the range of 0.05 to 0.3 microns, of a mixture of (a) from 5 to 70% by weight of one or more monoethylenically unsaturated monomers containing an amine or quaternary ammonium group in base or salt form, (b) from 1 to 50% by weight of one or more crosslinking polyethylenically unsaturated monomers having at least two nonconjugated points of ethylenic unsaturation and (c) from 0 to about 89% by weight (to make 100%) of one or more monoethylenically unsaturated monomers of neutral or nonionic character.

3. The composition according to claim 2 wherein the copolymer has a particle size from 0.1 to 0.3 microns and is a copolymer of a mixture of (a) 25 to 65% by weight of one or more monomers containing an amine or quaternary ammonium group in salt form, (b) 3 to 25% by weight of one or more crosslinking monomers of polyethylenically unsaturated character, and (c) the balance to make 100% of one or more monoethylenically unsaturated monomers of neutral or nonionic character and having a group of the formula $H_2C=C<$.

4. A composition according to claim 2 wherein the copolymerquaternary salt is a benzyl chloride quaternary of a copolymer of (a) 25 to 65% by weight of dimethylaminoethyl methacrylate, (b) 3 to 25% by weight of ethylene glycol dimethacrylate and (c) the balance to make 100% of one or more monoethylenically unsaturated monomers of neutral or nonionic character and having a group of the formula $H_2C=C<$.

5. A composition according to claim 4 wherein the copolymer quaternary salt is a benzyl chloride quaternary of a copolymer of (a) 25 to 65% by weight of dimethylamine and ethyl methacrylate, (b) 3 to 25% by weight of ethylene glycol dimethacrylate and (c) methyl methacrylate to make 100%.

6. A composition according to claim 2 in which the cross-linked copolymer contains quaternary ammonium groups.

7. A composition according to claim 1 which is an aqueous base paint having a pigment dispersed therein.

8. A composition according to claim 2 which is an aqueous base paint having a pigment dispersed therein.

9. A composition according to claim 3 which is an aqueous base paint having a pigment dispersed therein.

10. A composition according to claim 4 which is an aqueous base paint having a pigment dispersed therein.

11. A composition according to claim 5 which is an aqueous base paint having a pigment dispersed therein.

12. A sedimentation stable aqueous dispersion of a stably dispersed water-insoluble vinyl addition emulsion copolymer having a particle size in the range 0.05 to 0.3 microns of a mixture of (a) 5 to 70% by weight of one or more monoethylenically unsaturated monomers containing an amine or quaternary ammonium group, (b) 1 to 50% by weight of one or more crosslinking polyethylenically unsaturated monomers having at least two non-conjugated points of ethylenical unsaturation and (c) from 0 to 89% by weight (to make 100%) of one or more monoethylenically unsaturated monomers of neutral or nonionic character, at least 10% of the amine or quaternary ammonium groups being in salt form, the counterion of which contains boron, chromium, molybdenum or tungsten.

13. A composition according to claim 12 in which the copolymer comprises 25 to 65% by weight of component (a) and 3 to 25% by weight of component (b).

14. A composition as defined in claim 12 wherein the counterion is a chromate, dichromate or silicochromate ion.

15. A composition as defined in claim 12 wherein the counterion is a borate or metaborate ion.

16. A composition as defined in claim 12 wherein the counterion is a molybdate, molybdosilicate or phosphomolybdate ion.

17. A composition as defined in claim 12 wherein the counterion is a tungstate ion.

18. A dispersion as defined in claim 12 in which the copolymer is cross-linked and at least part of the cross-linking is that of a difunctional alkylating agent chemically combined with the nitrogen atoms of the quaternary ammonium groups in the copolymer.

19. A coating composition comprising an aqueous dispersion of a mixture of (1) a sedimentation stable water-insoluble addition emulsion polymer, the dispersed particles of which have a size in the range of 0.05 to 1.0 microns, selected from vinyl ester polymers, acrylic and methacrylic ester polymers or vinyl hydrocarbon polymers and (2) from 1 to 50% by weight of a copolymer as defined in claim 12.

20. A composition as defined in claim 19 wherein the counterion is a chromate, dichromate or silicochromate ion.

21. A composition as defined in claim 19 wherein the counterion is a borate or metaborate ion.

22. A composition as defined in claim 19 wherein the counterion is a molybdate, molybdosilicate or phosphomolybdate ion.

23. A composition as defined in claim 19 wherein the counterion is a tungstate ion.

24. As a sedimentation stable aqueous coating composition, a mixture of (1) a binder comprising a stable aqueous dispersion of a water-insoluble addition polymer, the dispersed particles of which have a size in the range 0.05 to 1.0 microns, selected from the group consisting of vinyl ester polymers, acrylic and methacrylic ester polymers and vinylhydrocarbon polymers, and (2) from 1 to 50% by weight, based on the weight of binder, of a stably dispersed water-insoluble, linear vinyl addition emulsion copolymer, the dispersed particles of which have a size in the range 0.05 to 0.3 microns, of a mixture of
   (a) 1 to 15% by weight of one or more monoethylenically unsaturated monomers containing an amine or quaternary ammonium group in base or salt form,
   (b) from 0 to 2.5% by weight of one or more cross-linking polyethylenically unsaturated monomers and
   (c) the balance to make 100% of one or more monoethylenically unsaturated monomers of neutral or nonionic character, the non-volatile content of the composition being from about 30% to 70% by weight.

25. As a sedimentation stable aqueous coating composition, a mixture of
(1) a binder comprising a stable aqueous dispersion of a water-insoluble addition polymer, the dispersed particles of which have a size in the range 0.05 to 1.0 microns, selected from the group consisting of vinyl ester polymers, acrylic and methacrylic ester polymers and vinylhydrocarbon polymers, and (2) from 1 to 50% by weight, based on the weight of binder, of a stably dispersed water-insoluble, linear vinyl addition emulsion copolymer, the dispersed particles of which have a size in the range 0.05 to 0.3 microns, of a mixture of
   (a) 1 to 15% by weight of one or more monoethylenically unsaturated monomers containing an amine or quaternary ammonium group in salt form, the salt being a metal counterion derived from boron, chromium, molybdenum or tungsten,
   (b) from 0 to 2.5% by weight of one or more crosslinking polyethylenically unsaturated monomers and
   (c) the balance to make 100% of one or more monoethylenically unsaturated monomers of neutral or nonionic character, the non-volatile content of the composition being from about 30% to 70% by weight.

References Cited
UNITED STATES PATENTS
3,494,878   5/1974   Harren et al.

MELVIN GOLDSTEIN, Primary Examiner

U.S. Cl. X.R.

117—72, 148; 260—2.1 E, 29.6 HN, TA, 29.7 UA